（12）United States Patent
Daynès et al.

(10) Patent No.: US 7,761,872 B1
(45) Date of Patent: Jul. 20, 2010

(54) METHOD FOR VIRTUALIZING MUTUALLY EXCLUSIVE LOCKS OF IMMUTABLE SHARED OBJECTS

(75) Inventors: Laurent Daynès, Santa Clara, CA (US); Grzegorz Czajkowski, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1176 days.

(21) Appl. No.: 11/366,194

(22) Filed: Mar. 1, 2006

Related U.S. Application Data

(60) Provisional application No. 60/685,474, filed on May 26, 2005.

(51) Int. Cl.
 G06F 9/455 (2006.01)
 G06F 9/46 (2006.01)
(52) U.S. Cl. .......................... 718/1; 718/104
(58) Field of Classification Search .............. 718/1, 718/104
See application file for complete search history.

(56) References Cited

U.S. PATENT DOCUMENTS

| 6,792,601 | B1 * | 9/2004 | Dimpsey et al. | 718/102 |
| 2003/0097360 | A1 * | 5/2003 | McGuire et al. | 707/8 |
| 2003/0097396 | A1 * | 5/2003 | Zhang et al. | 709/104 |

* cited by examiner

*Primary Examiner*—Meng-Ai An
*Assistant Examiner*—Brian Chew
(74) *Attorney, Agent, or Firm*—Martine Penilla & Gencarella LLP

(57) ABSTRACT

A method is provided to virtualize a mutually exclusive lock of a shared immutable object. A determination is made whether any threads have locked the immutable shared object. If threads have not locked the immutable shared object, threads of different tasks are allowed to fast lock and unlock the immutable shared object. If a thread requests the lock of an immutable shared object and the object is fast locked by another thread when both threads are from an equivalent task, the lock of the immutable shared object is inflated and the requesting thread is blocked. If a thread requests the lock of an immutable shared object and the object is fast locked by another thread when both threads are from different tasks, the lock of the immutable shared object is virtualized and granted to the requesting thread.

18 Claims, 3 Drawing Sheets

Unlocked Object

Before Lock Acquisition

After Lock Acquisition

METHOD FOR VIRTUALIZING MUTUALLY EXCLUSIVE LOCKS OF IMMUTABLE SHARED OBJECTS

CLAIM OF PRIORITY

This application claims priority to U.S. Provisional Patent application No. 60/685,474 filed on May 26, 2005 entitled "Method For Virtualizing Mutual Exclusive Locks of Immutable Shared Objects", and is hereby incorporated by reference.

BACKGROUND OF THE INVENTION

Modern programming languages, such as C# or the Java™ programming language, comprise built-in support for multi-threaded programming and concurrency. For example, both C# and the Java™ programming language offer the notion of threads as first-class objects of the language; in both languages, objects are associated with a mutually exclusive lock which can be used to synchronize concurrent activities. In both languages, the lock of an object is acquired for the duration of the execution of a block, using a language specific statement (such as the synchronized statement for the Java™ programming language or the lock statement for C#).

Frequently, modern programming languages such as C# or the Java™ programming language use a managed, runtime architecture: programs are compiled into an intermediate, architecture-neutral, binary form which is then executed by a virtual machine. Making the virtual machine of these managed runtime architectures capable of multi-tasking offers numerous performance advantages, such as decreased start-up time, decreased runtime overhead, and reduced memory footprint.

A multi-tasking virtual machine is capable of executing multiple programs in isolation in a single operating system process. Isolation is guaranteed by preventing program-visible interferences from happening. This is typically achieved by guaranteeing that the graph of objects created by each program is disjoint so that objects created by one task can not be reached by another task, and by precisely accounting for the resources of the OS process (e.g., threads, file descriptors) allocated to each task. Type safe programming languages prevent forging of object references, therefore a program can only access objects it has created and for which it has kept references.

It is, however, desirable to allow some objects to be shared across multiple tasks, transparently to programs, in order to further reduce the aggregate footprint of a multi-tasking virtual machine. Such transparent sharing should be limited to immutable objects in order to guarantee the absence of program-visible interferences. An immutable object is an object whose value cannot change once the object has been constructed. For example, in the multi-tasking implementation of the Java™ virtual machine, instances of java.lang.String are immutable: once constructed, an instance of java.lang.String cannot be changed. Instances of java.lang.String may be interned explicitly by programs, or implicitly by the JVM itself (JVM implementations typically intern String constants automatically, as well as String values holding the symbolic name of element of a class accessible via reflection, such as the name of methods, fields, classes and interfaces).

Transparent sharing of immutable objects across tasks is problematic when the programming language associates every object (including immutable ones) with a monitor for mutual exclusion control because interference can happen via monitor activity. To illustrate this, let us assume that a multi-tasking JVM transparently implements sharing of interned strings. Thus, the storage for any instance of java.lang.String whose method intern( ) was invoked is shared across all tasks. It is possible that two tasks can interfere with each other if both run the following code for example:

```
class A {
    static final private String COMPONENT_NAME = "A";
    static private boolean IS_INITIALIZED =false;
    static void initialize( ) {
        synchronized (COMPONENT_NAME) {
            if (!is_initialized( )) {
                do_init_actions( ); // possibly a long computation
                IS_INITIALIZED =true;
            }
        }
    }
    ...
}
```

Another example that could lead to interference is the following.

synchronized (o.getClass( ).getName( )){ . . . }

More subtle sharing can occur via canonicalization of objects. For instance, a JVM implementation may canonicalize and return an empty array of objects whenever it needs to return an empty array.

Interferences in these cases result from threads of different tasks competing for the same monitor. Thus, a thread of one task may be blocked by a thread of another task. This can easily be exploited for denial-of-service attacks. It can be argued that usage of the monitor of an immutable object is rare enough so that a strategy of "copy on first lock acquisition" could be used to avoid interferences. That is, a strategy where the immutable object would be copied so that each task operates with it's own copy of the immutable object. However, such a strategy requires updating all references in the task to the immutable object: not only references stored in objects allocated by the task, but also references stored in the local variable and expression stack of each of the task's thread. Such an operation would be extremely costly and impractical to implement.

A mechanism is therefore needed for allowing sharing of immutable objects while preventing lock-related, inter-task interference.

SUMMARY OF THE INVENTION

Embodiments of the present invention provide a method for virtualizing mutual exclusive locks of immutable shared objects in a computer program.

It should be appreciated that the present invention can be implemented in numerous ways, including as a process, an apparatus, a system, a device, or a method. Several inventive embodiments of the present invention are described below.

Broadly speaking, the present invention dynamically changes the monitor of an object into a set of monitors when threads of more than one task execute monitor operations simultaneously. Since testing whether a lock needs to be virtualized only occurs in the slow path of monitor acquisition, virtualization of the lock does not add any overhead to the most frequent cases of monitor acquisition/release.

In one embodiment, a determination is made whether any threads have locked the immutable shared object. If threads have not locked the immutable shared object, threads of different tasks are allowed to fast lock and unlock the immutable shared object. If a thread requests the lock of an immutable shared object and the object is fast locked by another thread when both threads are from an equivalent task, the lock of the immutable shared object is inflated and the requesting thread is blocked. If a thread requests the lock of an immutable shared object and the object is fast locked by another thread when both threads are from different tasks, the lock of the immutable shared object is virtualized and granted to the requesting thread.

In another embodiment, a computer readable medium has program instructions for virtualizing a lock of an immutable shared object. A determination is made whether any threads have locked the immutable shared object. If threads have not locked the immutable shared object, threads of different tasks are allowed to fast lock and unlock the immutable shared object. If a thread requests the lock of an immutable shared object and the object is fast locked by another thread when both threads are from an equivalent task, the lock of the immutable shared object is inflated and the requesting thread is blocked. If a thread requests the lock of an immutable shared object and the object is fast locked by another thread when both threads are from different tasks, the lock of the immutable shared object is virtualized and granted to the requesting thread.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1A:
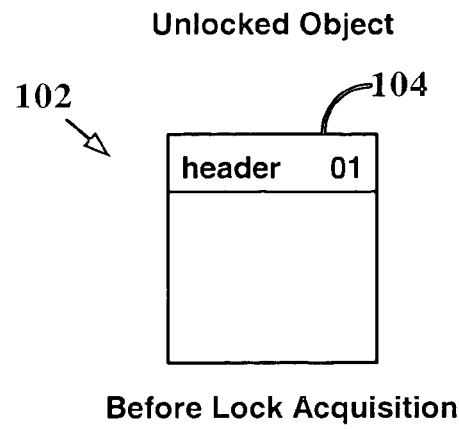
FIG. 1A is a diagram illustrating an unlocked immutable object before lock acquisition.

The present invention relates to dynamically virtualizing a mutually exclusive lock of shared immutable objects. The solution can be adapted to any mutually exclusive lock implementation, and offers the same performance as locking a non-virtualized lock when tasks are not contending for the lock. The invention optimizes the most frequent cases of lock acquisition. In the case of a virtualizable lock, these cases are expected to be:
1. locking of an object unlocked in all tasks.
2. unlocking of an object locked by a thread of a single task, with no pending lock request.
3. locking of an object already locked by the requester of the lock (nested locking).
4. unlocking of an object already locked by the requester of the lock (nested locking).

The method dynamically changes the monitor of an object into a set of monitors when threads of more than one task execute monitor operations simultaneously. The monitor data structure remains unvirtualized as long as only one task at a time manipulates the object. This allows the cost of virtualization to be paid only when true interference across tasks occurs, which is expected to be extremely rare. Furthermore, testing to see if the lock must be virtualized needs to be done only in the slow path of monitor acquisition, thus virtualization does not add any overhead to the most frequent cases of monitor acquisition/release.

Table 1 illustrates this principle. The state of the lock associated with an object is summarized in two columns, owner and virtualized, which show, respectively, the current owner of the lock (nil if none), and whether the lock is virtualized. The columns titled "task 1" and "task 2" show the locking operation that changed the state of the lock shown on the same line. For example, line 1 of the table shows the state of the lock after an acquire operation performed by thread "T1.1" of task 1. For clarity, the name given to thread in the table includes the identifier of the task, i.e., thread Ti.j denotes thread j in task i.

As can be seen, as long as only one task uses the lock of an immutable object, the original locking mechanism is used and virtualization isn't needed. In particular, virtualization is not needed if threads of different tasks use the lock in non-overlapping sequences. For instance, at states 1 to 4, only thread T1.1 of task 1 uses the lock; then, at states 5 and 6, only thread T2.1 use the lock. Thus, virtualization is not needed for states 0 to 6.

Virtualization kicks in only when threads of more than one task operate simultaneously on the lock. In the example shown on Table 1, this happens at state 8, when thread T2.1, another task, requests the lock. The lock isn't locked by any thread in task 2 and therefore should be granted to T2.1. In this case, the runtime virtualizes the lock of the object so that each task is given private storage to represent the lock of the object. That is, the mutual exclusion lock of an immutable object is dynamically changed to a set of lock data structures, one per task with at least one thread owning the lock.

TABLE 1

Scenario Illustrating the Principle of virtualization

| state | owner | virtualized | task 1 | task 2 |
|---|---|---|---|---|
| 0 | nil | false | (initial state) | |
| 1 | T1.1 | false | acquire(T1.1) | |
| 2 | T1.1 | false | acquire(T1.1) | |
| 3 | T1.1 | false | release(T1.1) | |
| 4 | nil | false | release(T1.1) | |
| 5 | T2.1 | false | | acquire(T2.1) |
| 6 | nil | false | | release(T2.1) |
| 7 | T1.1 | false | acquire(T1.1) | |
| 8 | T2.1, T1.1 | true | | acquire(T2.1) |

As briefly mentioned above, virtualization of an object monitor can be efficiently implemented by changing the lock implementation only for when the lock is contended. That is, the locking logic assumes by default that the lock is not virtualized, and applies the single-task, single owner behavior. When a second lock owner requests the lock, the non-virtualized locking implementation routes execution to the logic implementing the queuing of conflicting requests. This is where testing for virtualization takes place: if the requester is from a different task than the current owner, then the locking logic initiates lock virtualization. The following section describes in more detail how this approach has been implemented in a multi-tasking implementation of the HotSpot Java™ Virtual Machine, which features a state-of-the-art locking mechanism.

Like other high performance locking implementations for the Java™ platform, the original locking mechanism of the HotSpot JVM is optimized for the following frequent cases:
1. locking of an unlocked object,
2. unlocking of an uncontended lock,
3. locking of an object already locked by the requester of the lock (nested lock request),
4. unlocking of a nested lock.

The locking implementation uses an "inflation" scheme, whereby a lock is inflated into a heavyweight representation when contention for the lock occurs. Once inflated, the lock of an object remains inflated, regardless of whether it is locked or not, or whether its queue of pending requests is empty or not. The heavyweight representation of the lock is "deflated" in the background, during garbage collection, at a point in time when all threads are suspended and known to be outside of code sections that manipulate the header of an object.

Most of the time, the lock of an object isn't inflated. Common locking cases only require storing a small fixed-size lock record identifying the owner of the lock. Instead of using expensive dynamic memory management for these fixed-sized lock records, they are stored on the stack of the lock owner, at a dedicated location in the current stack frame.

An object can be in one of the following three states with respect to locking: unlocked, fast-locked, or inflated. Only two bits are necessary to encode this three-value state, as shown on Table 2. The JVM uses the two lower bits of the object's header for this purpose, which leaves room to also store a pointer to a 4-byte, aligned data structure in the header.

TABLE 2

Two-bit encoding used for locking

| | | |
|---|---|---|
| 0 | 1 | unlocked |
| 0 | 0 | fast-locked |
| 1 | 0 | inflated |
| 1 | 1 | unused |

In the unlocked state, the header comprises non-lock related information. In the fast-locked state, the header comprises a pointer to a stack-allocated lock record of the current owner of the lock. In the inflated state, the header comprises a pointer to a heavyweight representation of the lock. Both stack-allocated lock records and heavyweight lock representation includes a copy of the original object header.

FIG. 1A is a diagram illustrating an unlocked immutable object before lock acquisition. In this condition, object 102 contains header 104 in which the lowest two bits are encoded for an unlocked object. Once a thread requests the lock of object 102, the process of fast locking will commence.

Figure 1B:
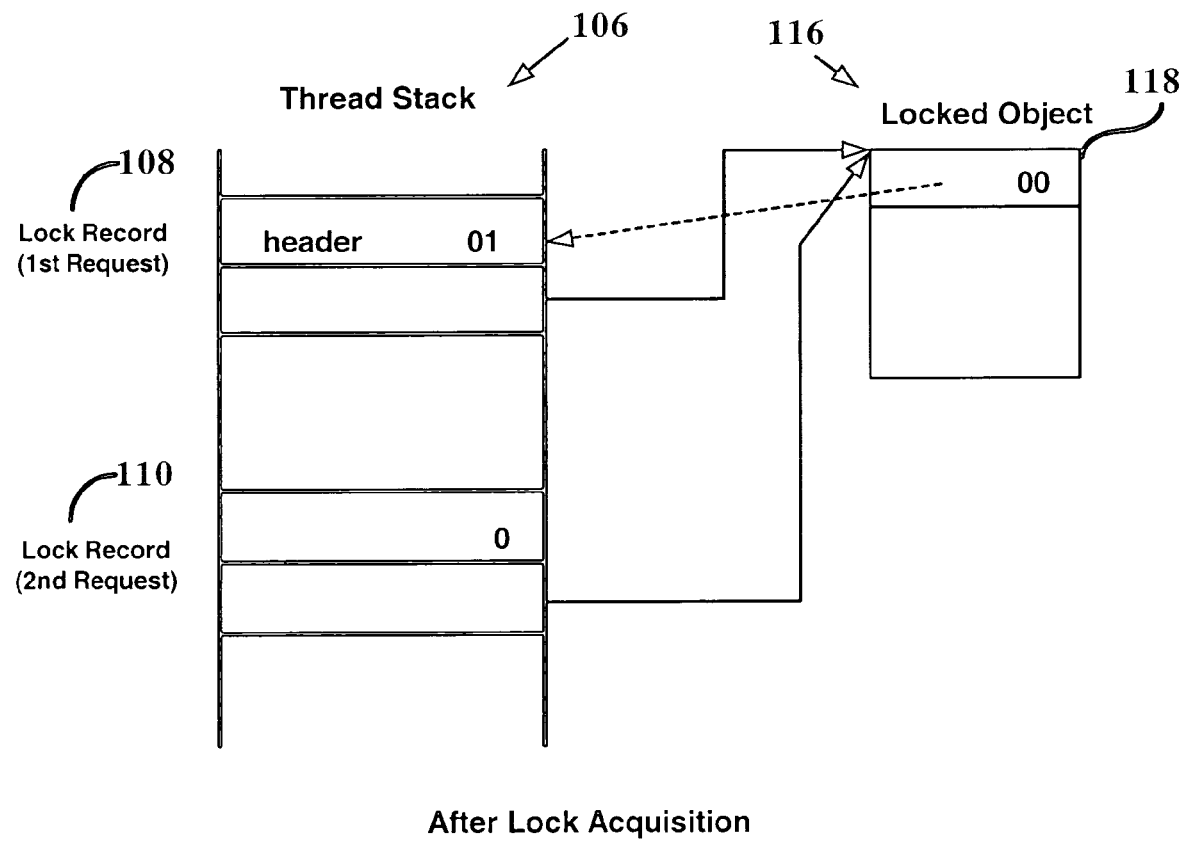
FIG. 1B is a diagram illustrating fast locking of an unlocked immutable object in accordance with one embodiment of the present invention.

FIG. 1B is a diagram illustrating fast locking of an unlocked immutable object in accordance with one embodiment of the present invention. Since locking always assumes that object 116 is unlocked, locking will try to atomically replace header 118 with a pointer to lock record 108 allocated on thread stack 106. Lock record 108 is filled before the atomic replacement with the current contents of header 118 with the lower two-bits set to the unlocked state and with the address of object 116.

The location of lock record 108 is four-byte aligned, so the lowest two bits of the pointer stored in header 118 are set to 0 and therefore encode the fast-locked state. If the atomic replacement succeeds, the lock is acquired. If atomic replacement fails, header 118 is tested for a nested lock case. This is achieved by testing if the address stored in header 118 points to the stack of the current thread. If so, this is a nested lock request and lock record 110 will be allocated on thread stack 106. Lock record 110 will then be filled with a pointer to the nested locked object and a 0 value in place of a copy of the object header. If the address stored in header 118 doesn't point to a location in the current thread's stack, execution is routed to a slow path. Release of an object's lock in the fast-locked state starts with testing for the nested case: if the header stored in a lock record has the null value (i.e., 0), the header value describes a granted nested request. In this case, nothing needs to be done (the lock record on the stack frame is implicitly freed). Otherwise, the record is for the top-most lock request granted to the thread. In this case, unlocking consists of atomically replacing the object's header with the header recorded in the stack-allocated lock record.

Lock virtualization leaves these mechanisms unchanged, and thus enjoys the efficiency of the original high-performance locking, mechanism when objects aren't shared, or when they may be shared and threads of different tasks do not use their locks simultaneously.

The need for virtualization is tested only in the slow path for locking. The slow path is entered when the address stored in the object header does not point to a location of the current thread's stack, meaning that either the lock is owned by another thread, or the lock has already been inflated into a heavyweight lock representation. The state of the object header, fast-locked or inflated, indicates which of the two cases virtualization needs to address. If the object is in the fast-locked state, the lock of the object is inflated.

Figure 2:
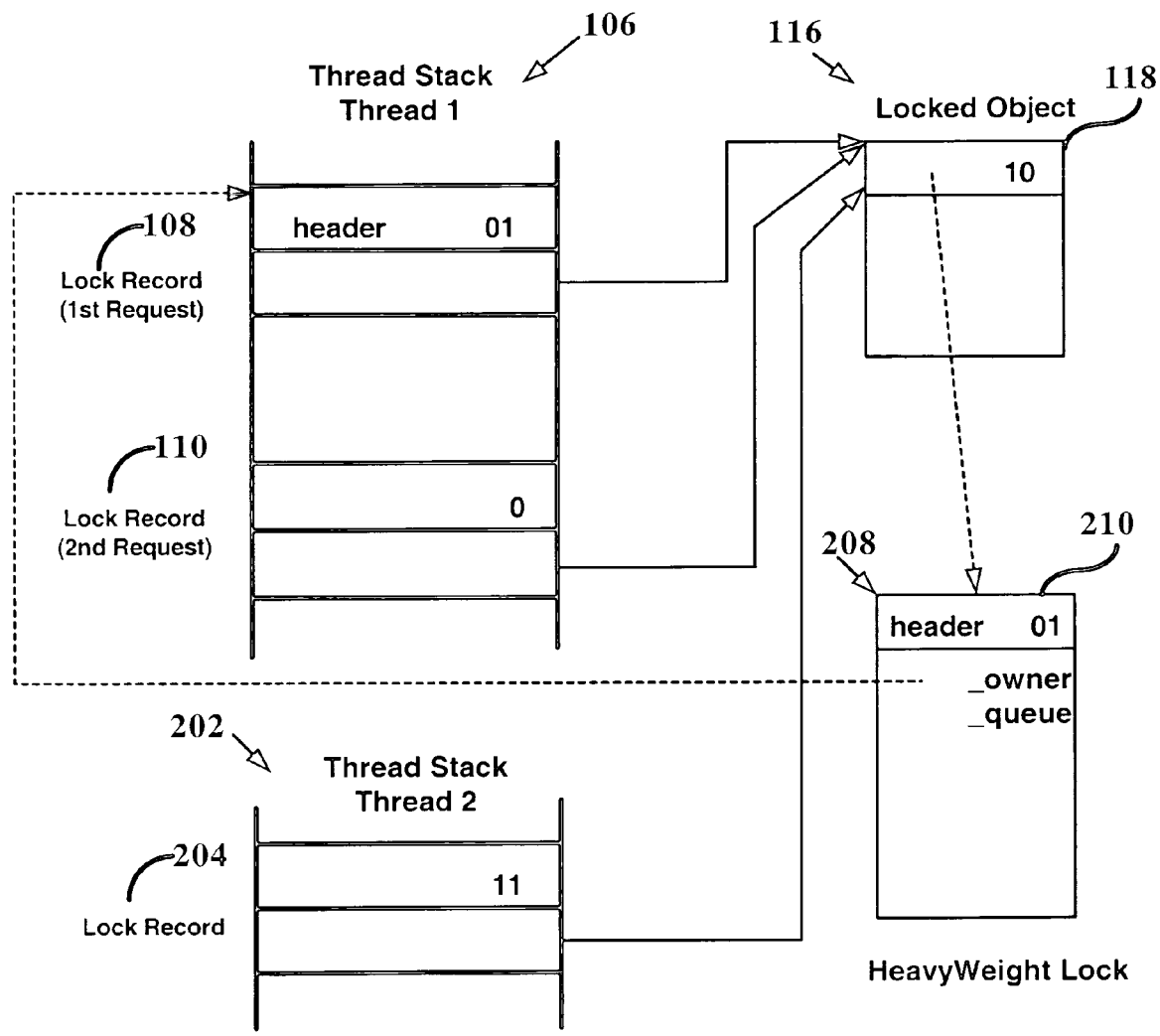
FIG. 2 is a diagram illustrating inflation of a fast lock into a heavyweight lock in accordance with one embodiment of the present invention.

FIG. 2 is a diagram illustrating inflation of a fast lock into a heavyweight lock in accordance with one embodiment of the present invention. Inflating a lock starts with allocating a heavyweight lock representation 208 and filling it with information obtained from the lock record describing the current owner of the lock—in particular, with the header of lock record 108. Second, a stack-allocated lock record 204 is filled in the thread stack 202 of the requester. Lock record 204 contains a pointer to object 116 and a header value that isn't null (so it doesn't look like a granted nested lock) and that does not look like a locked object either. The unused state (see Table 2) fulfills these two conditions and is therefore used. Header 118 is then atomically replaced with a new header composed of the pointer to heavyweight lock representation 208 and the inflated state at the lowest two bits. Once the lock is inflated, the locking logic is resumed and the requester is added to the queue of pending requests where it remains blocked. In other words, the request will be suspended until the queue is emptied and the requester is allowed to process its request.

Figure 3:
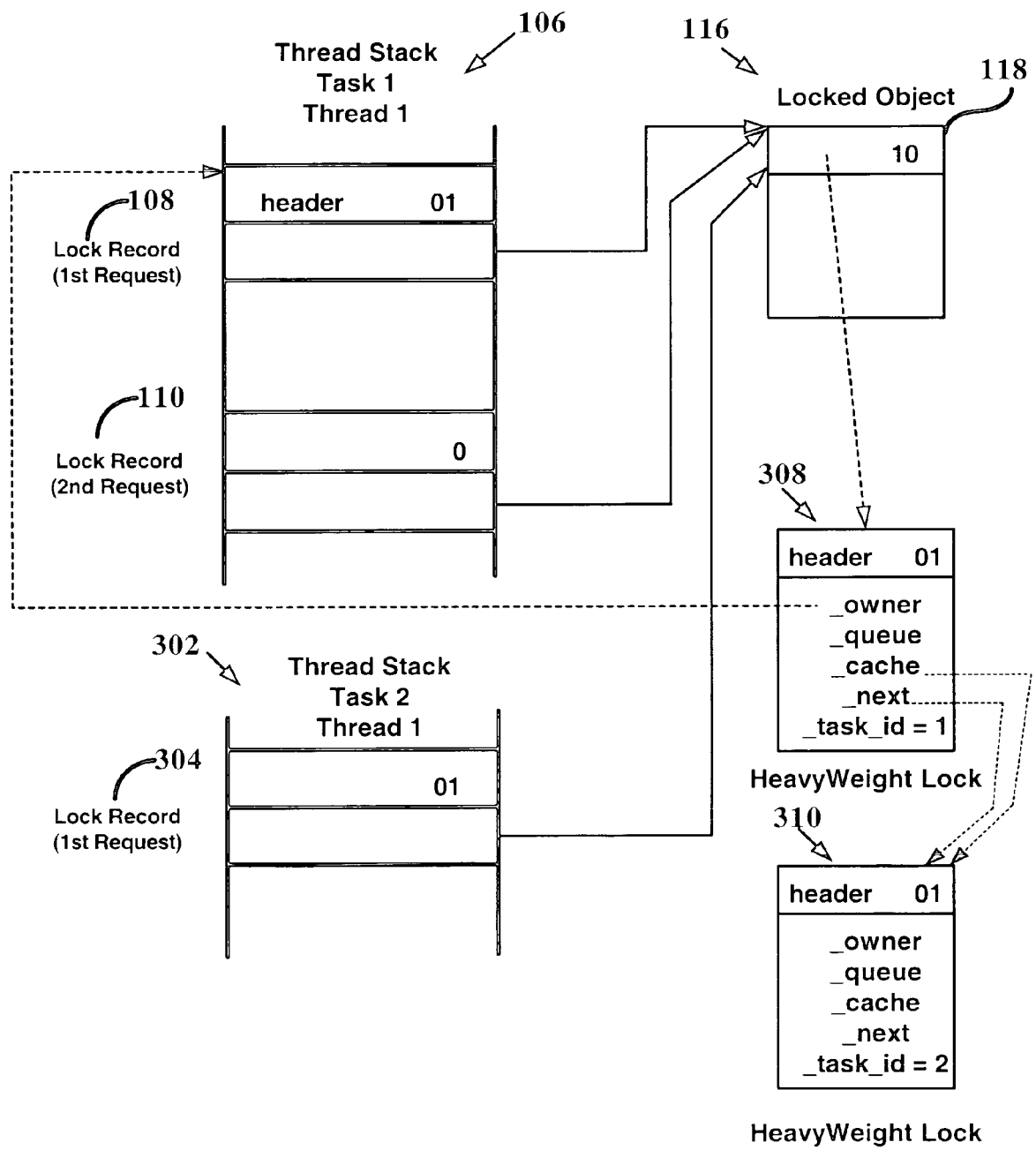
FIG. 3 is a diagram illustrating lock data structures after virtualization for two tasks in accordance with one embodiment of the present invention.

FIG. 3 is a diagram illustrating lock data structures after virtualization for two tasks in accordance with one embodiment of the present invention. As illustrated by heavyweight locks 308 and 310, lock virtualization adds three fields to the heavyweight representation of a lock: a task identifier, a link to the next heavyweight representation for the lock so that a linked list of heavyweight locks can be formed, and a link to the most recently used heavyweight representation of the lock that acts as a cache for fast retrieval. The latter is needed only for the head of the linked list of heavyweight locks that forms the virtualized lock.

Lock virtualization also modifies the slow path of lock acquisition and release operations, and is used only on inflated locks. Locking an inflated lock is augmented with code for retrieving the heavyweight lock representation for the task of the thread requesting the lock. The heavyweight lock representation is retrieved by scanning the linked list of heavyweight locks and comparing the task identifier stored in each link with the identifier of the requesting task. Scanning the linked list may be avoided by first comparing task identifiers with the link to the most recently used heavyweight representation of the lock (the cache field) contained in the head of the linked list. Whenever the comparison of the cache field fails to find the identifier of the requesting task, the cache field is updated with the reference of the heavyweight lock that is found.

If a heavyweight lock representation is found and is locked, the thread of the task is added to the queue of blocked requests for the heavyweight representation and suspended; otherwise, the thread is atomically set as the owner of the heavyweight lock. A blocked request is dequeued when it is allowed to obtain the heavyweight lock representation. That is, the thread is removed from the queue of blocked requests and resumes processing operations from the suspended state. When this occurs, the dequeued thread is set as the owner of the heavyweight representation of the lock. When the queue of blocked requests is empty, the heavyweight representation of the virtualized lock is set to an unlocked state. If a heavyweight lock is not found for the requesting task, a new heavyweight lock is allocated and atomically inserted in the linked list. When a lock is virtualized for more than one task, only the cache of the head of the linked list is set; the cache of other members in the linked list is set to a null value.

Lock virtualization also modifies the deflation algorithm. Deflation takes place when threads are out of locking/unlocking code, and works by scanning the storage area for heavyweight locks to identify those that aren't locked (i.e., those that have an empty queue and no owner). These locks are then returned to the pool of heavyweight lock representations and the original header of the object they were associated with is installed back in the object. The object is then in the unlocked state so fast locking can be performed. Lock virtualization slightly modifies the original deflation algorithm so that a virtualized lock is deflated only if all the heavyweight lock representations are unlocked. Otherwise, the linked list is trimmed so as to remove unlocked heavyweight lock representations. Trimming the linked list may require a change to the head of the list of heavyweight lock representation in the locked object's header.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for virtualizing a lock of an immutable shared object, comprising method operations of:
   determining whether any threads have locked the immutable shared object;
   if no threads have locked the immutable shared object, the method includes allowing threads of different tasks to fast lock and fast unlock the immutable shared object;
   if a first thread requests the lock of the immutable shared object fast locked by a second thread and a task of the first thread is equivalent to a task of the second thread, the method includes inflating the lock of the immutable shared object and blocking the first thread, and allocating storage for a heavyweight representation of the lock for the task of the second thread that fast locked the immutable shared object; and
   if the first thread requests the lock of the immutable shared object fast locked by the second thread and the task of the first thread is different from the task of the second thread, the method includes virtualizing the lock of the immutable shared object and granting the virtualized lock to the first thread.

2. The method of claim 1, wherein the method operation of inflating the lock of the immutable shared object includes,
   setting an owner of the heavyweight representation of the lock to the second thread;
   setting a pointer to the heavyweight representation of the lock in a header of the immutable shared object;
   adding the first thread in a queue of blocked lock requests in the heavyweight representation of the lock; and
   suspending the first thread.

3. The method of claim 1, wherein the method operation of virtualizing the lock of the immutable shared object includes,
   setting an owner of the heavyweight representation of the lock to the second thread;
   setting a pointer to the heavyweight representation of the lock in a header of the immutable shared object;
   allocating a second heavyweight representation of the lock for the task of the first thread;
   linking the second heavyweight representation to the first heavyweight representation; and
   setting the owner of the second heavyweight representation of the lock to the first thread.

4. The method of claim 1, further comprising:
   locking the virtualized lock by a thread, the locking including,
   determining if there is a heavyweight representation of the lock for a task of the thread;
   if there is no heavyweight representation of the lock for the task of the thread, the method includes,
      allocating a new heavyweight representation of the lock;
      linking the new heavyweight representation to the heavyweight representation of the lock of the immutable shared object; and
      setting an owner of the new heavyweight representation of the lock to the thread;

if there is a heavyweight representation of the lock for the task of the thread and the heavyweight representation is in an unlocked state, the method includes
atomically setting the first thread as the owner;
if the heavyweight representation of the thread is in a locked state, the method includes,
adding the thread to a queue of blocked requests in the heavyweight representation; and
suspending the thread.

5. The method of claim 1, further comprising:
unlocking the virtualized lock, the unlocking including,
searching for a heavyweight representation of the lock for the task of the thread; and
if a queue of blocked requests is empty, the method includes,
setting a heavyweight representation of the virtualized lock to an unlocked state;
if the queue is not empty, the method includes,
dequeueing the thread from a first blocked request; and
setting the thread as an owner of the heavyweight representation of the lock.

6. The method of claim 3, further comprising:
deflating the virtualized lock, the deflating including,
determining if the heavyweight representation and the second heavyweight representation are unlocked;
if the heavyweight representation and the second heavyweight representation are unlocked then the method includes, removing each heavyweight representation so that fast locking may be performed.

7. The method of claim 6, wherein the method operation of removing each heavyweight representation is performed through a garbage collection operation.

8. The method of claim 6, further comprising:
if the heavyweight representation is unlocked and the second heavyweight representation is not unlocked, the method includes, removing the unlocked heavyweight representation.

9. The method of claim 2, wherein the method operation of virtualizing the lock of the immutable shared object includes,
adding a link to a most recently used heavyweight representation of the lock, the link enhancing the determination of whether a heavyweight representation of the lock exists for a task.

10. A computer storage having program instructions executable by a processor for virtualizing a lock of an immutable shared object, comprising:
program instructions for determining whether any threads have locked the immutable shared object;
program instructions for allowing threads of different tasks to fast lock and fast unlock the immutable shared object if no threads have locked the immutable shared object;
program instructions for inflating the lock of the immutable shared object and blocking the first thread if a first thread requests the lock of the immutable shared object fast locked by a second thread and a task of the first thread is equivalent to a task of the second thread, and allocating storage for a heavyweight representation of the lock for the task of the second thread that fast locked the immutable shared object; and
program instructions for virtualizing the lock of the immutable shared object and granting the virtualized lock to the first thread if the first thread requests the lock of the immutable shared object fast locked by the second thread and the task of the first thread is different from the task of the second thread.

11. The computer storage of claim 10, wherein the program instructions for inflating the lock of the immutable shared object includes,
program instructions for setting an owner of the heavyweight representation of the lock to the second thread;
program instructions for setting a pointer to the heavyweight representation of the lock in a header of the immutable shared object;
program instructions for adding the first thread in a queue of blocked lock requests in the heavyweight representation of the lock; and
program instructions for suspending the first thread.

12. The computer storage of claim 10, wherein the program instructions for virtualizing the lock of the immutable shared object includes,
program instructions for setting an owner of the heavyweight representation of the lock to the second thread;
program instructions for setting a pointer to the heavyweight representation of the lock in a header of the immutable shared object;
program instructions for allocating a second heavyweight representation of the lock for the task of the first thread;
program instructions for linking the second heavyweight representation to the first heavyweight representation; and
program instructions for setting the owner of the second heavyweight representation of the lock to the first thread.

13. The computer storage of claim 10, further comprising:
program instructions for locking the virtualized lock by a thread, the locking including,
program instructions for determining if there is a heavyweight representation of the lock for a task of the thread;
if there is no heavyweight representation of the lock for the task of the thread, the computer readable medium includes,
program instructions for allocating a new heavyweight representation of the lock;
program instructions for linking the new heavyweight representation to the heavyweight representation of the lock of the immutable shared object; and
program instructions for setting an owner of the new heavyweight representation of the lock to the thread;
if there is a heavyweight representation of the lock for the task of the thread and the heavyweight representation is in an unlocked state, the computer readable medium includes
program instructions for atomically setting the first thread as the owner;
if the heavyweight representation of the thread is in a locked state, the computer readable medium includes,
program instructions for adding the thread to a queue of blocked requests in the heavyweight representation; and
program instructions for suspending the thread.

14. The computer storage of claim 10, further comprising:
program instructions for unlocking the virtualized lock, the program instructions for unlocking including,
program instructions for searching for a heavyweight representation of the lock for the task of the thread; and
program instructions for setting a heavyweight representation of the virtualized lock to an unlocked state if a queue of blocked requests is empty;

if the queue is not empty, the computer readable medium includes,
    program instructions for dequeueing a first blocked request; and
    program instructions for setting the thread as an owner of the heavyweight representation of the lock.

15. The computer storage of claim 12, further comprising:
program instructions for deflating the virtualized lock, the program instructions for deflating including,
    program instructions for determining if the heavyweight representation and the second heavyweight representation are unlocked; and
    program instructions for removing each heavyweight representation so that fast locking may be performed when the heavyweight representation and the second heavyweight representation are unlocked.

16. The computer storage of claim 15, wherein the program instructions for removing each heavyweight representation are executed through a garbage collection operation.

17. The computer storage of claim 15, further comprising:
    program instructions for removing the unlocked heavyweight representation if the heavyweight representation is unlocked and the second heavyweight representation is not unlocked.

18. The computer storage of claim 11, wherein the program instructions for virtualizing the lock of the immutable shared object includes,
    program instructions for adding a link to a most recently used heavyweight representation of the lock, the link enhancing detection and retrieval of the heavyweight representation.

* * * * *